UNITED STATES PATENT OFFICE.

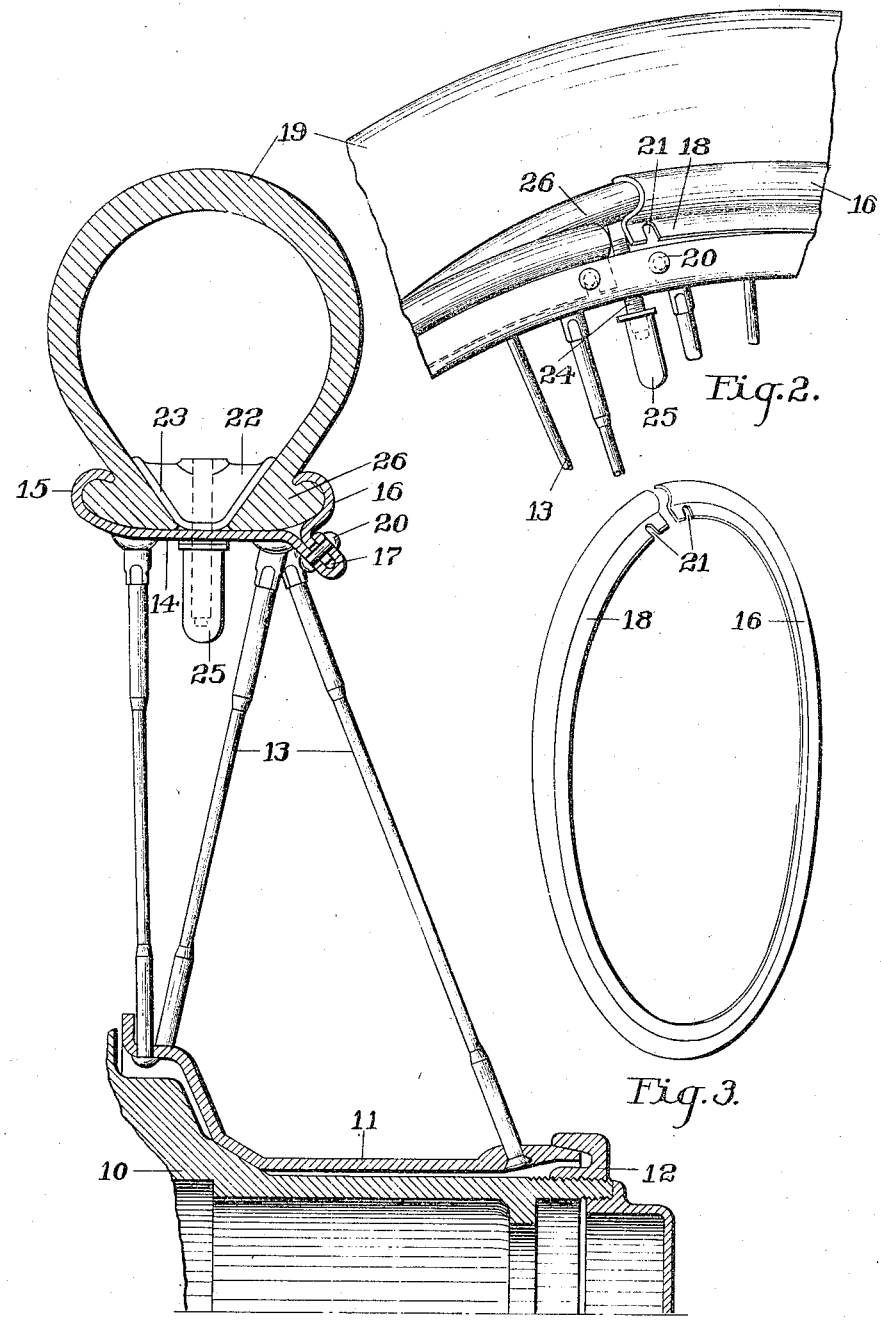

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

WHEEL-RIM.

1,122,012.         Specification of Letters Patent.     Patented Dec. 22, 1914.

Application filed March 24, 1913. Serial No. 756,503.

*To all whom it may concern:*

Be it known that I, ALLEN LOOMIS, a citizen of the United States, and resident of Detroit, Wayne county, State of Michigan, have invented certain new and useful Improvements in Wheel-Rims, of which the following is a specification.

This invention relates to motor vehicles, and particularly to the wheel construction thereof.

The invention is shown as applied to a wheel having a two-part steel rim and wire spokes, but it will be understood that the invention is not limited in its application to this type of wheel.

In the prior art, it has been proposed to form a wheel rim of two parts, one of which is provided with a circumferential groove in which the other part is adapted to fit and be secured. The securing means for these parts usually comprises the tire casing itself, which is mounted upon the rim, and dependence is largely placed upon this tire casing for maintaining the rim parts in position.

In the present invention, the wheel rim is formed in two parts, connected as above suggested, with additional provision for preventing the creeping of one of the parts relative to the other and for positively holding the parts in their normal position. The means for accomplishing this object is at once simple and efficient, and will be described in detail.

Other objects of the invention will be apparent from the following description, taken in connection with the drawings which form a part of this specification, and in which, Figure 1 is a transverse sectional view through a wheel embodying this invention; Fig. 2 is a fragmentary perspective view of the wheel rim, showing how the parts are assembled; and Fig. 3 is a perspective view of the split ring part of the rim.

Referring to the drawings, 10 represents the main hub of a vehicle wheel, and 11 is the detachable hub which is secured thereto by a nut 12. The wire spokes 13 extend from the detachable hub to the main body portion of the rim 14, as will be clearly understood. This rim 14 is preferably made of steel, and one of its tire flanges 15 is shown as an integral part of the body of the rim. The other tire flange is detachable from the rim proper, and is in the form of a split ring 16, shown in full in Fig. 3. For connecting the split ring 16 with the rim proper, the latter is formed, as shown in Fig. 1, with a circumferential groove 17, made by bending a part of the metal back on itself. Preferably, this groove is diagonally disposed in cross section, so that when the lip 18 of the split ring 16 is inserted in the groove, any tendency to pull the ring away from the center of the rim will only seat the ring more firmly in the groove.

It will be understood that the tire casing 19 is placed on the rim previously to the split ring 16 being inserted in the groove 17, and the ring is then inserted as shown in Fig. 2, which figure shows the ring nearly in place, it being necessary only to push the end of the ring 16 into the groove with a suitable tool.

When the tire 19 is fully inflated, doubtless the above construction would be sufficient to hold the rim parts firmly together, but under unusual circumstances, such as the puncturing of a tire on a curve, the tire casing might be rolled off of the rim by carrying with it the split ring 16. For this reason, additional securing means are provided for the split ring 16, which means will now be described in detail.

The groove part of the rim 14 is provided with one or more pins 20, shown in the drawings as rivets, which extend across the groove 17. The split ring 16 is formed with one, or preferably two, notches 21 adjacent its meeting ends, and when the lip 18 of the ring is inserted in the groove 17, these notches 21 receive the pins 20, as shown in Figs. 1 and 2, so that the split ring 16 is positively prevented from creeping on the rim. It will be seen that the notch 21 is shown as perpendicular to the edge of the ring 16 thus permitting the ring to be easily removed and put on, and no circumferential or endwise movement of the ring is required in the operation. At the same time the notch and pin construction positively prevents accidental relative circumferential movement of the rim parts. For the purpose of preventing the ends of the split ring 16 from working out of the groove 17, a clamp 22, in the form of a spreader 23, is provided. This clamp or spreader has a threaded stem 24 which extends through the rim 14 adjacent the pins 20 and has a screw cap 25 fitted over its end for securing it to the ring. If desired, the valve stem of the inner tube of the tire may be utilized to form this clamp by arranging the valve stem in the desired position relative to the pins 20.

It will be seen that the clamp 22 securely holds the beads 26 of the tire casing 19 in the tire flanges, and the meeting ends of the ring 16 are thereby secured in the groove 17. As the split ring is prevented from creeping relative to the rim proper and the ends of the ring are held in the groove, obviously the two rim parts are secured against relative movement.

A specific embodiment of the invention has been described in detail, which embodiment is deemed to be new and advantageous, and will be specifically claimed, but it should be understood that the invention is not limited to the exact details of construction shown, as it will be apparent that changes may be made without departing from the spirit or scope of the invention.

Having thus described my invention, what I claim and desire to secure by Letters Patent is:

In a vehicle wheel, a rim having an integral tire flange on one side and a groove formed in an integral part of the rim on the other side, said groove extending in cross section diagonally of the plane of the wheel, a split ring forming the other tire flange of the rim and having a diagonally extending lip adapted to enter said groove, said lip having a notch perpendicular to its edge adjacent one end of said split ring, means to prevent creeping of the ring on the rim while permitting complete removal of the ring from the rim with the means in place without circumferential movement of the ring on the rim, said means including a pin arranged transversely in said groove and adapted to enter said notch as the ring is placed on the rim, and a tire clamp secured to the rim adjacent the meeting ends of the ring and adapted to secure said ring in the groove.

In testimony whereof I affix my signature in the presence of two witnesses.

ALLEN LOOMIS.

Witnesses:
 GEO. E. GODDARD,
 LE ROI J. WILLIAMS.

Copies of this patent may be obtained for five cents each, by addressing the "Commissioner of Patents, Washington, D. C."